United States Patent [19]

Ike et al.

[11] Patent Number: 5,253,128
[45] Date of Patent: Oct. 12, 1993

[54] SIGNAL RECORDING AND REPRODUCING APPARATUS WITH REDUNDANT CONTROL SIGNAL HEADS

[75] Inventors: Kasuo Ike, Kanagawa; Seiichi Sakai, Tokyo, both of Japan

[73] Assignee: Sony Corporation, Tokyo, Japan

[21] Appl. No.: 798,206

[22] Filed: Nov. 26, 1991

[30] Foreign Application Priority Data

Nov. 30, 1990 [JP] Japan .................................. 2-339776

[51] Int. Cl.⁵ .............................................. G11B 15/14
[52] U.S. Cl. ......................................... 360/64; 360/63; 360/27
[58] Field of Search ....................... 360/64, 63, 62, 70, 360/77.05, 77.07, 77.16, 19.1, 47, 27, 84, 85, 95

[56] References Cited

U.S. PATENT DOCUMENTS 4,510,535  4/1985  Tokumitsu ............................ 360/70
5,016,120  5/1991  Okada et al. ...................... 360/19.1

Primary Examiner—Aristotelis Psitos
Assistant Examiner—Jennifer Pearson
Attorney, Agent, or Firm—Lewis H. Eslinger; Jay H. Maioli

[57] ABSTRACT

In a recording and reproducing apparatus according to the present invention, a drum unit incorporates a first recording/reproducing control head. A second recording/reproducing control head is disposed within a running path of a magnetic tape. A control signal synchronizing with a record starting point of recording tracks is recorded by the first or second recording/reproducing control head. The second recording/reproducing control head is controlled in accordance with a state where the control signal is recorded or reproduced by the first recording/reproducing control head, thus recording or reproducing the control signal. A deviation in tracking which is caused due to stretching/contraction of the magnetic tape can be effectively avoided. The control signals can be recorded or reproduced more surely than in the prior art.

8 Claims, 5 Drawing Sheets

SIGNAL RECORDING AND REPRODUCING APPARATUS WITH REDUNDANT CONTROL SIGNAL HEADS

BACKGROUND OF THE INVENTION

This invention relates to a signal recording and reproducing apparatus, and more particularly to an improvement of a video tape recorder.

In a conventional video tape recorder, recording on a control track CTL is performed in the longitudinal direction along the lower edge of the magnetic tape during the recording process on the recording tracks TR. A magnetic head is matched in position with the recording tracks TR on the basis of reproducing signals from the control tracks CTL during the reproducing process of the magnetic tape (FIG. 1).

The control head employed for recording on the control track CTL is provided within a running path of the magnetic tape separately from a rotary drum.

To be specific, as illustrated in FIG. 2, a video tape recorder 1 includes a drum unit 2. A magnetic tape 3 wound on the drum unit 2 is carried from a feed pins 4A, 4B to a control head 6 sequentially through the drum unit 2 and take-up pins 5A, 5B.

The drum unit 2 is now mounted with magnetic heads 7A, 7B disposed at an angular interval of 180°. The drum unit 2 includes an upper drum 2A rotationally driven and a fixed lower drum 2B.

The magnetic heads 7A, 7B sequentially form the recording tracks TR1, TR2 . . . on the magnetic tape 3 wound obliquely on the drum unit 2.

The control head 6 effects recording on the control track CTL along the lower edge of the magnetic tape 3 at a record starting timing of the recording tracks TR1, TR2 . . . in the longitudinal direction.

The above-mentioned control head 6 is, however, positioned outwardly of the take-up pins 5A, 5B with respect to the drum unit 2. Provided is a recording position distance d in the longitudinal direction between the control signal recorded by the control head 6 and a reproduction starting point P of the corresponding recording track TR.

However, if the magnetic tape is stretched or contracted due to temperature characteristics thereof, or if there is a mechanical deviation of the video tape recorder, the positional relation between the recording track TR and the control signal, i.e., the recording position distance d is fluctuated.

This presents a problem of causing an error in the tracking information of the magnetic heads 7A, 7B with respect to the recording track which is now being reproduced by the video tape recorder 1.

The control head 6 is a magnetic head serving for the recording or reproducing process. It is therefore impossible to confirm a state of the control signal to be recorded on the control track CTL during the record on the control track CTL. In some cases, it is not found out that no control track CTL is formed until the magnetic tape 3 is reproduced.

SUMMARY OF THE INVENTION

In view of the foregoing, an object of this invention is to provide a recording and reproducing apparatus in which it is capable of adjusting tracking without depending on a stretch or contraction of the magnetic tape 3 and recording the control signal more surely than in the prior art.

To obviate the foregoing problems, according to the present invention, in a recording and reproducing device 10 arranged such that a magnetic tape 3 extending in a longitudinal direction is wound on a drum unit 2, recording tracks TR1, TR2 . . . are sequentially formed by a magnetic heads 7A, 7B mounted on the drum unit 2, and the information is recorded thereon and read by reproducing the information from the recording tracks TR1, TR2 . . . , the recording and reproducing apparatus comprises a first recording and reproducing control head 11 for sequentially recording or reproducing control signals on or from the lower edge of the magnetic tape 3; and a second recording and reproducing control head 12, disposed within a running path of the magnetic tape 3 to be recorded or reproduced, for recording or reproducing the control signals on the basis of a recording state of the control signals or a reproducing state of the first recording and reproducing control head 11, wherein: when recording the information, and if the control signal synchronizing with a record starting point of the recording tracks is not detected from the second recording and reproducing control head 12, the control signal is recorded by the second recording and reproducing control head 12 in place of the first recording and reproducing control head 11; and, when reproducing the information, and if the control signal is not detected from the first recording and reproducing control head 11, the control signal is regenerated from the second recording and reproducing control head 12 in place of the first recording and reproducing control head 11.

When recording the information, the recording and reproducing device 10 causes the first recording and reproducing control head 11 to record the control signals sequentially on the lower edge of the magnetic tape 3 in synchronization with the record starting point P of the recording tracks TR. A recording state of the control signal is detected with a reproduction by the second recording and reproducing head 12.

When detecting that the control signal is not recorded by the first recording and reproducing control head 11, the recording and reproducing apparatus 10 causes the second recording and reproducing control head 12 to start recording the control signal. Even if a clog or the like is produced in the first recording and reproducing control head 11 during the recording process, the second recording and reproducing control head 12 is capable of surely effecting the record on the recording tracks TR1, TR2 . . . .

When reproducing the information, the first and second recording and reproducing control heads 11, 12 reproduce the control signals. Even when the control signal is not detected from the first recording and reproducing control head 11, the second recording and reproducing control head 12 is capable of reproduction. The tracking reliability of the magnetic head can be thereby enhanced.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings.

Figure 2:
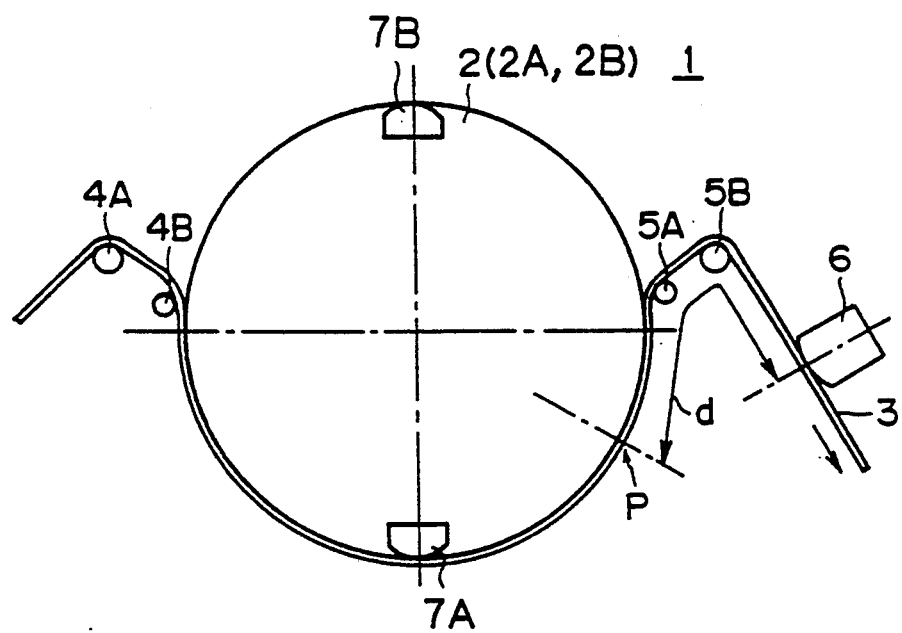
FIG. 2 is a schematic plan view illustrating a conventional recording and reproducing apparatus.
Figure 3:
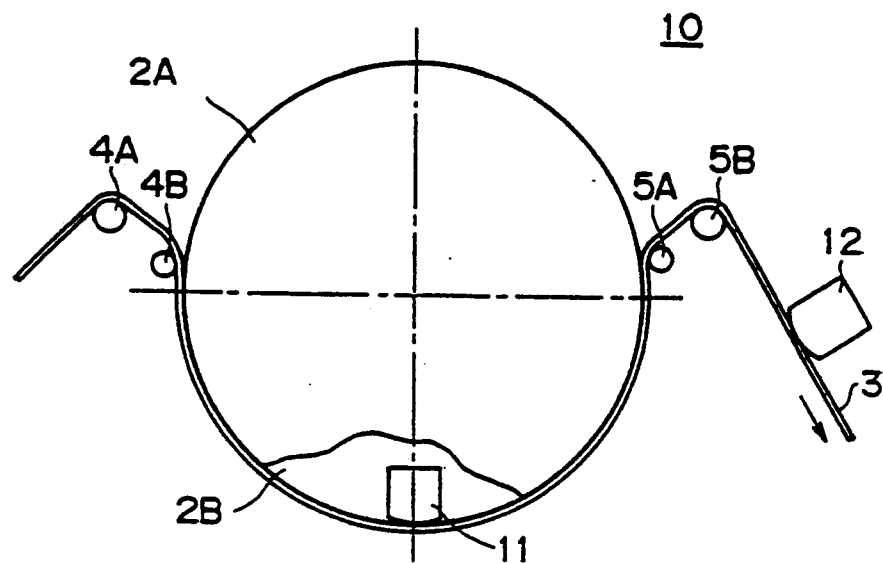
FIG. 3 and FIG. 4 are schematic plan and side views showing one embodiment of a recording and reproducing apparatus of this invention.
Figure 4:
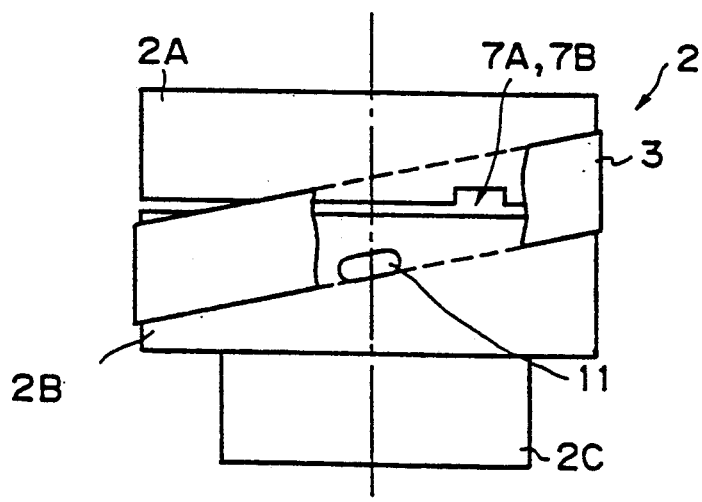

Referring to FIGS. 3 and 4 wherein the element corresponding to those in FIG. 2 are marked with the same symbols, the numeral 10 designates generally a video tape recorder. An embedded control head 11 is provided in a lower drum 2B.

In this embodiment, the embedded control head 11 is embedded in the central part of a winding angular area of a magnetic tape 3 to reduce an influence by stretching/contraction of the magnetic tape 3. The embedded control head 11 slides along a lower edge of the magnetic tape 3, thus recording and reproducing control tracks CTL.

An auxiliary control head 12 is disposed outwardly winding side pins 5A, 5B with respect to a rotary drum 2. The auxiliary head 12 slides on recording tracks TR1, TR2 ... formed on the lower edge of the magnetic tape 3 in running.

Figure 5:
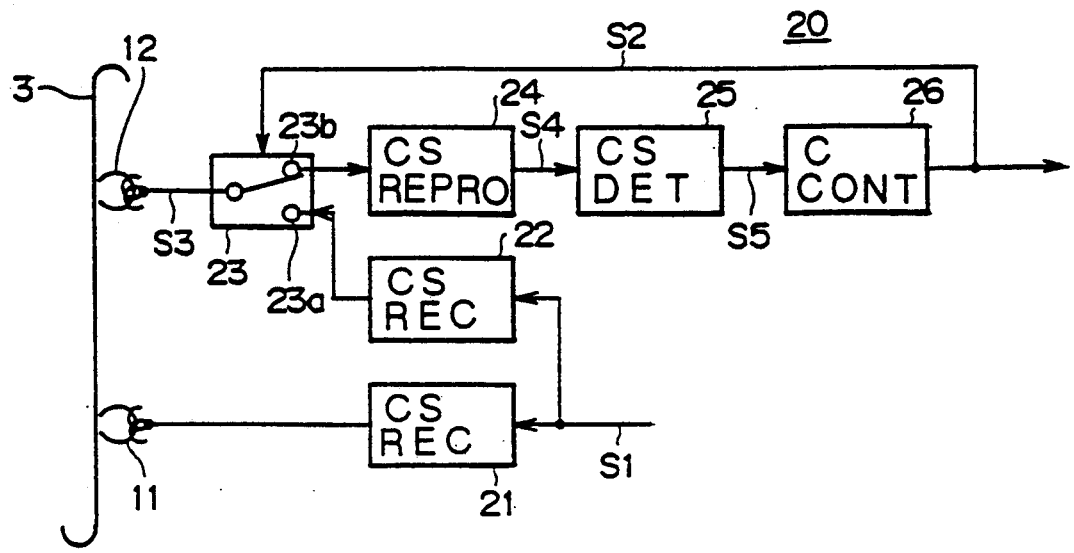
FIG. 5 and FIG. 6 are block diagrams illustrating one embodiment of a recording circuit and a reproducing circuit of the recording and reproducing apparatus of this invention.
Figure 6:
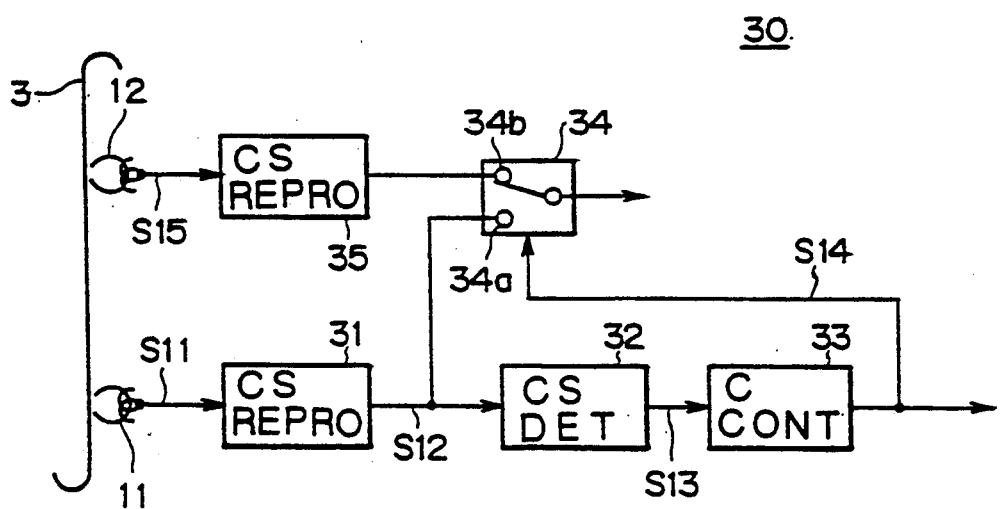

A video tape recorder 10 includes a recording circuit 20 (FIG. 5) and a reproducing circuit 30 (FIG. 6).

In the video tape recorder 10, the control tracks CTL are sequentially formed on the magnetic tape 3 by the recording circuit 20 during the record mode on the recording tracks TR.

The recording circuit 20 includes control signal recording circuits 21, 22. Inputted to the control signal recording circuits 21, 22 are recording control signals S1 corresponding to a write start timing of the recording tracks TR.

The control signal recording circuit 21 supplies control signals to the embedded control head 11 and sequentially records the control signals through the embedded control head 11.

Figure 7:
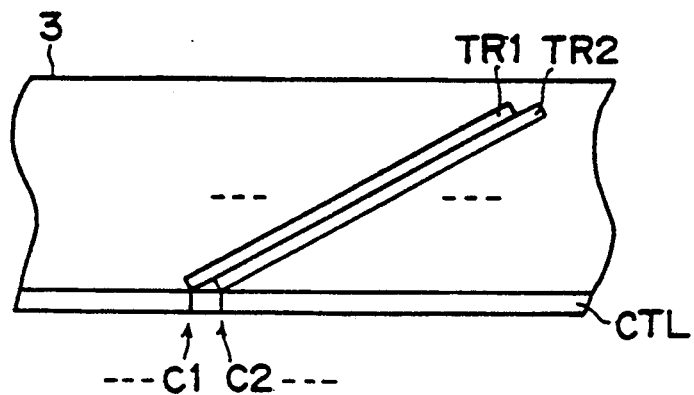
FIG. 7 is a plan view showing a positional relation between recording tracks and control signals recorded according to the present invention.

The video tape recorder 10 sequentially forms the recording tracks TR1, TR2 ... in synchronization with the control signals C1, C2 ..., wherein recording position distances d between the recording tracks TR1, TR2 ... and the control signals C1, C2 ... are set substantially to 0 (FIG. 7).

The control signal recording circuit 22 inputs the recording control signal S1 to an input terminal 23a of a changeover circuit 23.

In the changeover circuit 23, when detecting a reproduction of a clog in the embedded control head 11 upon an input of a changeover signal S2, the recording control signal S1 inputted from the control signal recording circuit 22 is recorded on the magnetic tape 3 through the auxiliary control head 12.

For this process, the changeover circuit 23 changes over a switch to an output terminal 23b when the recording control signal S1 is normally recorded by the embedded control head 11 upon the input of the changeover signal S2. A detection signal S3 detected from the control tracks CTL is outputted to a control signal reproducing circuit 24.

The control signal reproducing circuit 24 reproduces a reproducing control signal S4 from the detection signal S3 and outputs it to a control signal detection circuit 25.

Figure 8A:
FIGS. 8A-8C are signal waveform diagrams of assistance in explaining the operation of the recording circuit.

The control signal detection circuit 25 detects a pulse signal S5 (FIG. 8A) on inputting a reproducing control signal S4 consisting of a pulse signal given at a predetermined interval from the control signal reproducing circuit 24 and supplies the signal S5 to a changeover control circuit 26.

Figure 8B:
Figure 8C:

The changeover control circuit 26 detects whether the auxiliary control head 12 detects the control signal from the pulse signal S5 or not. If the control signal is not detected twice continuously (FIG. 8B), the changeover signal S2 is risen to logic "1" (FIG. 8C).

This implies that the embedded control head 11 is impossible of recording the control signal due to the clog or the like. The changeover circuit 23 detects such a state from the changeover signal S2 and changes over a changeover switch from the output terminal 23b to the input terminal 23a.

At this moment, the auxiliary control head 12 ceases the reproduction of the control signals from the magnetic tape 3 but in turn starts recording the control signal in place of the embedded control head 11.

Started is recording of the control signal on the control track CTL of the magnetic tape 3, the control signals being inputted via the control signal recording circuit 22, the changeover circuit 23 and the auxiliary control head 12.

The changeover control circuit 26 on the other hand, when detecting that the control signals are recorded from the pulse signal S5, makes a logic level of the changeover signal S2 fall down to logic "0".

During a reproducing process, a reproducing circuit 30, as illustrated in FIG. 6, supplies a detection signal S11 to a control signal reproducing circuit 31 from the control track CTL through the embedded control head 11.

The control signal reproducing circuit 31 reproduces a reproducing control signal S12 from a detection signal S11 read from the magnetic tape 3 and outputs the signal S12 to a control signal detection circuit 32.

The control signal detection circuit 32 detects the pulse signal from the reproducing control signal S12 and outputs a pulse signal S13 to a changeover control circuit 33.

The changeover control circuit 33 detects whether or not the control signals are recorded on the magnetic tape 3 from the pulse signal S13. If the control signals are not detected during a predetermined period, the logic level of a changeover switch S14 is risen to logic "1", while the input terminal of a regenerative changeover circuit 34 is changed over from 34a to an input terminal 34b.

The reproducing changeover circuit 34 inputs, to the input terminal 34a, the reproducing control signal S12 reproduced from the embedded control head 11. The same circuit 34 simultaneously inputs, to the input terminal 34b, a reproducing signal S15 reproduced from the auxiliary control head 12 through the control signal reproducing circuit 35. The circuit 34 also outputs the control signals reproduced from the embedded control head 11 or the auxiliary control head 12.

Based on the construction discussed above, when recording a video signal, the video tape recorder 10 effects the record from a record starting point P of the recording tracks TR in synchronization with the control signal recorded by the embedded control head 11 provided in the lower drum 2B.

The video tape recorder 10 is thereby capable of detecting, even if the magnetic tape 3 is stretched or contracted, the stretching/contracting states of a recording portion of the magnetic tape 3 in which the recording tracks TR are now being reproduced in response to the reproducing control signal S11. A tracking accuracy can be thus enhanced.

At this time, the auxiliary control head 12 provided on a running path of the magnetic tape 3 reproduces the control signal from the control track CTL on which recording is carried out by the embedded control head 11.

The changeover circuit 23 transmits the control signals reproduced from the auxiliary control head 12 to the changeover control circuit 26 sequentially through the control signal reproducing circuit 24 and the control signal detection circuit 25.

The changeover control signal circuit 26 at this time outputs the changeover signal S2 assuming a level of logic "0" while detecting that the control signals are normally recorded by the embedded control head 11. The operation of detecting the recording state of the control tracks CTL continues.

For this process, the changeover control circuit 26, when the embedded control head 11 detects that the control track CTL does not undergo recording due to an occurrence of clog or the like, rises the changeover signal S2 to the level of logic "1" and changes over the switch of the changeover circuit 23 to the input terminal 23a.

In consequence of this, the clog is produced in the embedded control head 11 for recording the control signals. Even in such a state that the control signal S1 can not be recorded, recording of the control signal S1 is changed over to the auxiliary control head 12, whereby the control signal can be recorded once again from an unrecorded position.

For this process, the recording tracks TR are reproduced to read the video signal. In this case, the video tape recorder 10 reads the regenerative control signal S11 from the control tracks CTL of the magnetic tape 3 through the embedded control head 11.

At this moment, the video tape recorder 10 reproduces the control signals sequentially through the control signal reproducing circuit 31 and the reproducing changeover circuit 34. Magnetic head 7A, 7B are drive-controlled to scan the recording tracks TR1, TR2 . . . .

The video tape recorder 10 eventually detects that the embedded control head 11 does not detect the control signals due to the clog and the like with the aid of the changeover control circuit 33. Thereupon, the input terminal of the reproducing changeover circuit 34 is changed over from 34a to 34b in response to a reproducing head changeover signal S14 outputted from the changeover control circuit 33.

As a result, the video tape recorder 10 reads a reproducing control signal S15 read from the auxiliary control head 12 via a control signal reproducing circuit 35 and outputs the signal S15 via the reproducing changeover circuit 34. The magnetic heads 7A, 7B are controlled to scan the recording tracks TR1, TR2 . . . .

Based on the construction given above, recording is effected by synchronizing the record starting point P of the recording tracks TR with the control signal, thereby making it possible to enhance the tracking accuracy without depending on stretching/contraction of the magnetic tape 3.

The video tape recorder 10 includes the lower drum 2B incorporating the embedded control head 11 which serves for the recording/reproducing operations. The auxiliary control head 12 is provided on the running path of the magnetic tape 3. When recording the video signal, the auxiliary control head 12 confirms a state where the embedded control head 11 effects the record on the control track CTL. If abnormal, the auxiliary control head 12 records the control signal S1. The control signal S1 can be thus surely recorded.

Provided are the embedded and auxiliary control heads 11, 12 as detection heads of the control signals when reproducing the video signal. Hence, even if the embedded control head 11 is brought into such a state that the control signal can not be detected due to the clog or the like, the auxiliary control head 12 is capable of detecting the control signal. A servo function is thereby enhanced.

The embedded control head 11 is embedded in the lower drum 2B of the rotary drum, thereby eliminating the necessity for providing the embedded control head 11 for the recording/reproducing operations and the auxiliary control head 12 for confirming the recording state together within the tape running path. It is therefore possible to save the space for placing the control heads 11, 12.

Figure 9:
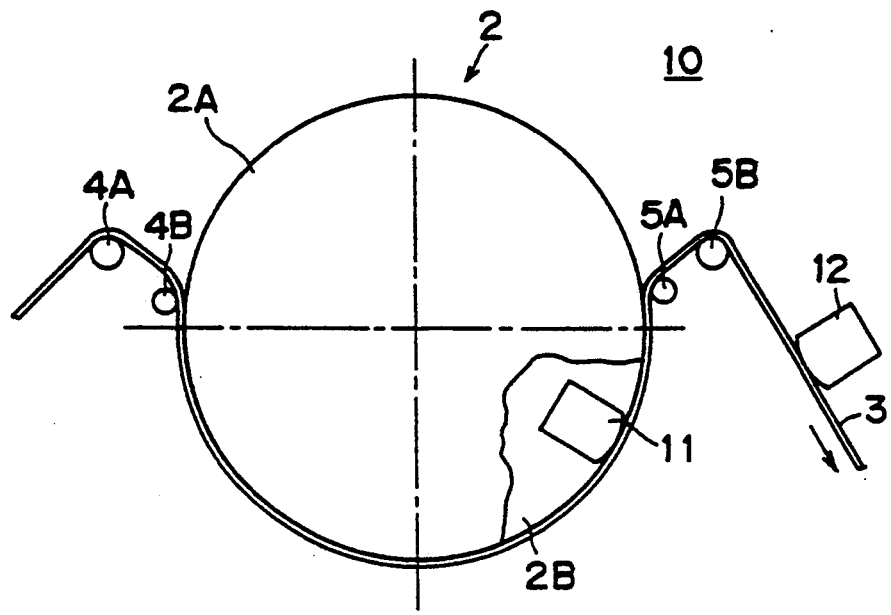
FIG. 9 is a schematic plan view of assistance in explaining another embodiment.
Figure 1:
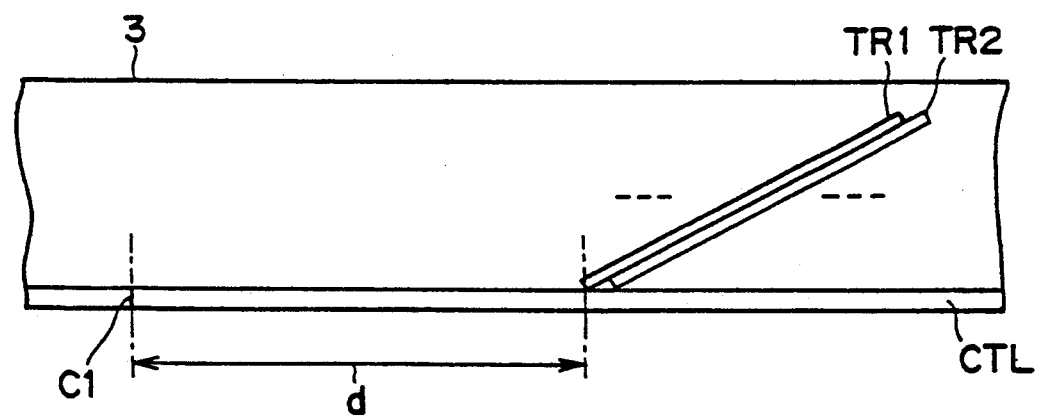
FIG. 1 is a schematic plan view showing a positional relation between a conventional control signal and recording tracks.

Stated in the embodiment discussed above is the arrangement that the embedded control head 11 is disposed in the central position of the winding angular area of the magnetic tape 3. The present invention is not, however, limited to this arrangement. The position for placement is adaptable to a variety of cases, wherein, as illustrated in FIG. 9, the head is provided at the lower part of the record starting point P of the recording tracks TR to record the control signal S1 in synchronization with the start of record on the recording tracks TR.

Stated also in the embodiment discussed above is the case wherein the present invention is applied to a so-called upper drum rotation type rotary drum as a drum unit 2. The present invention is not, however, limited to this case but may be applied to a so-called intermediate drum rotation type rotary drum.

Stated further is in the embodiment discussed above is the arrangement that the magnetic tape 3 is wound on the drum unit 2 in an angular range of 180° or greater. The present invention is not, however, limited to this arrangement but may be applied to a variety of winding angles.

Mentioned in the above-described embodiment is that the invention is applied to the video tape recorder. The present invention is not, however, limited to the video tape recorder but may be applied to other recording/reproducing apparatuses.

As discussed above, according to the present invention, the drum unit incorporates the first recording/reproducing control head and also the second recording/reproducing control head disposed within the magnetic tape running path. The control signals are so recorded as to eliminate the recording position distance between the recording track and the control signal recorded by the first recording/reproducing control head. A tracking error attributed to stretching/contraction of the magnetic tape can be thereby further reduced.

During the record of the information, the second recording/reproducing control head confirms the recording state of the control signals recorded by the first recording/reproducing control head. If not recorded on the control tracks, the second recording/reproducing control head records the control signals, thereby making to possible to effectively avoid the possibility that the control signals may not be recorded during the recording process.

Besides, during the reproduction of the information, a detecting state of the control signal detected by the first recording/reproducing control head is confirmed. If the control signal is not detected from the first recording/reproducing control head, the second recording/reproducing control head reproduced the control signal. It is thus feasible to effectively avoid disturbances in tracking which are caused by the fact that the control signal is not detected by the first recording/reproducing control head.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A signal recording and reproducing apparatus wherein a magnetic tape extending in a longitudinal direction is wound on a drum unit, recording tracks are sequentially formed by an information recording/reproducing rotary magnetic head mounted on said drum unit, and the information is recorded thereon and read by reproducing said information from said recording tracks, comprising:
   a first recording/reproducing control head for sequentially recording or reproducing control signals on or from said magnetic tape;
   a circuit for detecting said control signals reproduced from or recorded by said first recording/reproducing control head and for generating a switch signal;
   a second recording/reproducing control head, disposed within a running path of said magnetic tape, for recording or reproducing said control signals; and
   a changeover circuit for selecting one of said first and second recording/reproducing control heads for recording or reproducing said control signals in response to said switch signal.

2. The signal recording and reproducing apparatus according to claim 1, wherein if said control signal synchronized with a record starting point of said recording tracks is not detected from said second recording/reproducing control head, said control signal is recorded by said second recording/reproducing control head in place of said first recording/reproducing control head.

3. The signal recording and reproducing apparatus according to claim 1, wherein when reproducing the information, if said control signal is not detected from said first recording/reproducing control head, said control signal is reproduced from said second recording/reproducing control head in place of said first recording/reproducing control head.

4. The signal recording and reproducing apparatus according to claim 1, wherein said second recording/reproducing control head is provided at a position outside said rotary drum, and said first recording/reproducing control head is embedded on a stationary drum included in said drum unit.

5. The signal recording and reproducing apparatus according to claim 1, wherein said first recording/reproducing control head is disposed in a central position of the winding angular area of the magnetic tape around said drum unit.

6. The signal recording and reproducing apparatus according to claim 1, wherein said recording/reproducing control heads are disposed to record/reproduce said control signals at starting points of said recording tracks.

7. The signal recording and reproducing apparatus according to claim 1, wherein said first recording/reproducing control head is disposed on a stationary lower drum of said drum unit and said information recording/reproducing rotary magnetic head is mounted on a rotatable upper drum of said drum unit.

8. The signal recording and reproducing apparatus according to claim 5, wherein said winding angular area of the magnetic tape is approximately 180°.

* * * * *